Sept. 18, 1956        W. O'BANNON        2,763,150
APPARATUS FOR COOLING DEWPOINT TESTER
Filed Sept. 8, 1953        2 Sheets-Sheet 1
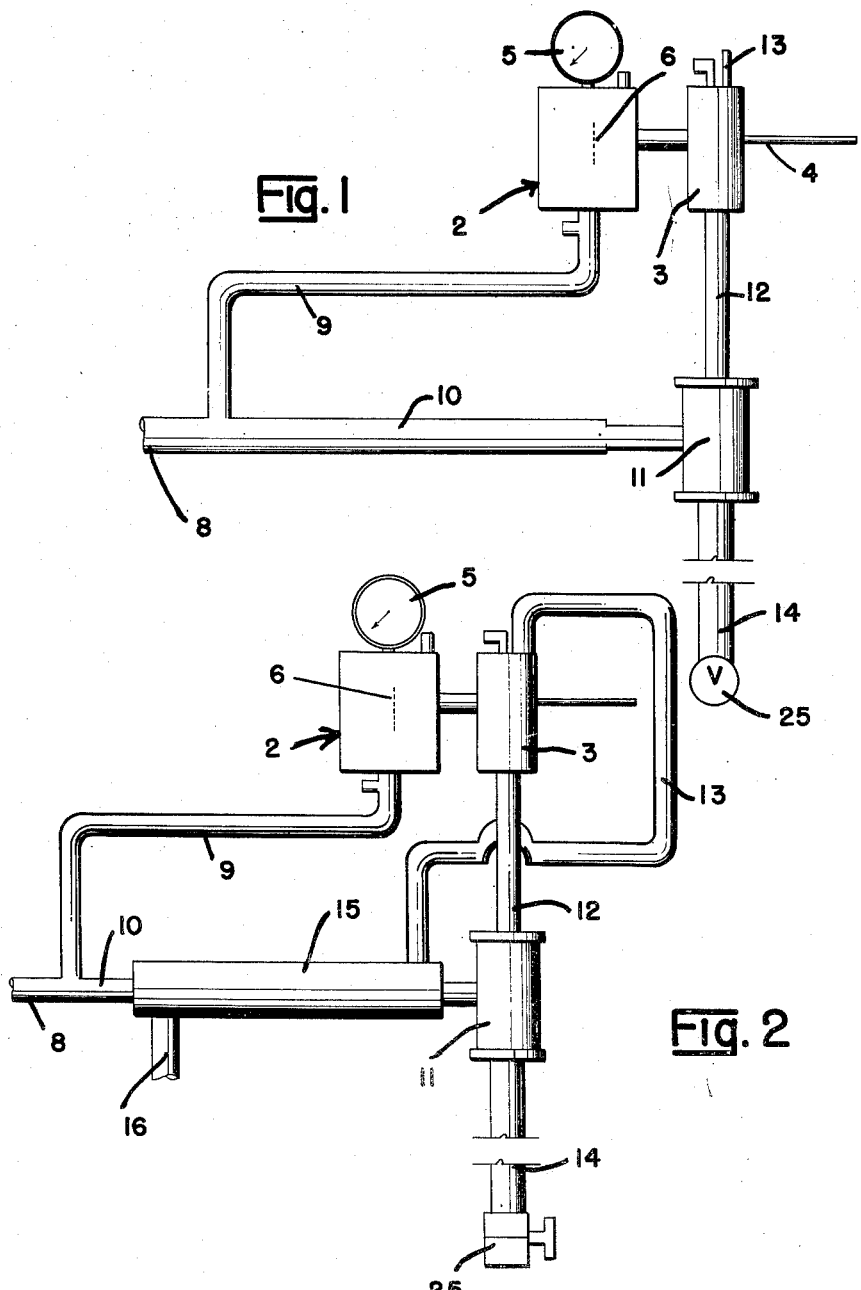
WILLIAM O'BANNON
*INVENTOR.*
BY *Jack W. Hayden*
*ATTORNEY*

Sept. 18, 1956 W. O'BANNON 2,763,150
APPARATUS FOR COOLING DEWPOINT TESTER
Filed Sept. 8, 1953 2 Sheets-Sheet 2
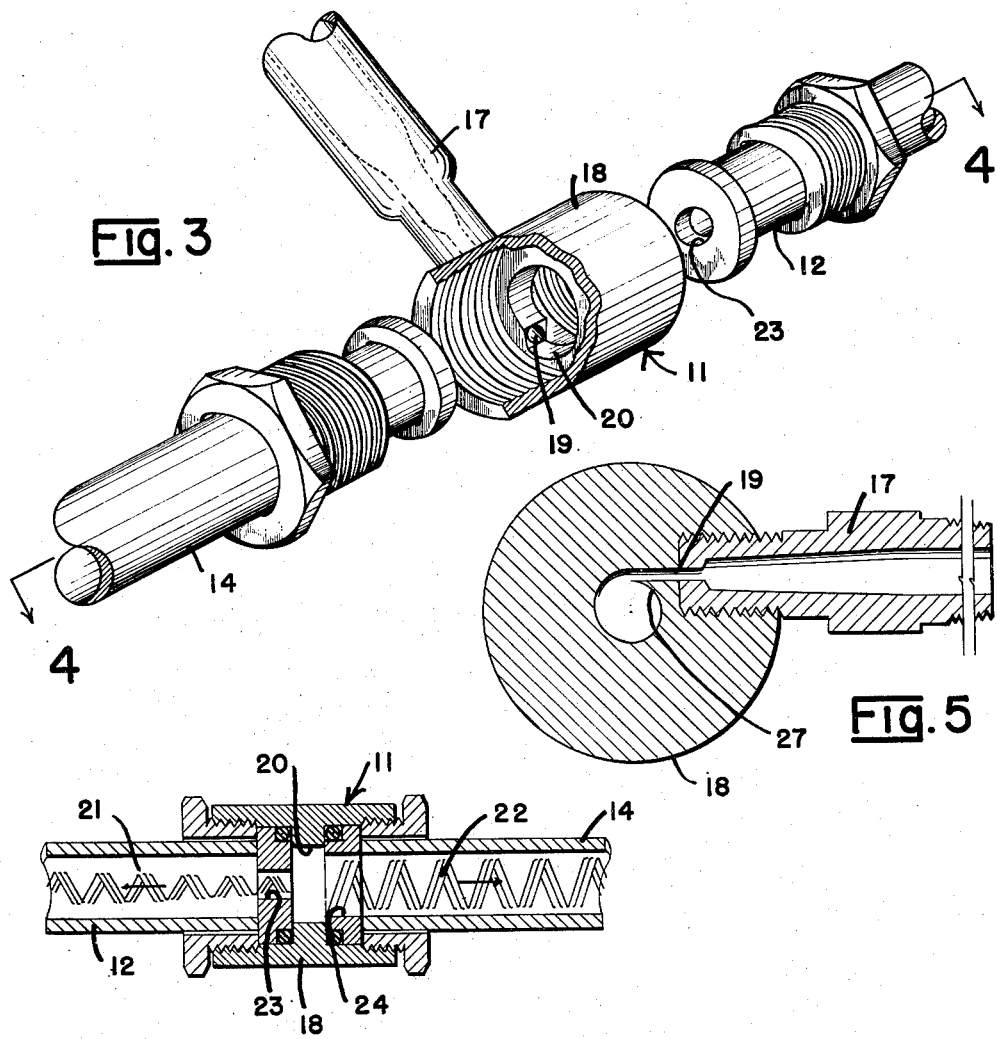
WILLIAM O'BANNON
INVENTOR.
BY Jack W. Hayden
ATTORNEY

United States Patent Office 2,763,150
Patented Sept. 18, 1956

2,763,150

APPARATUS FOR COOLING DEWPOINT TESTER

William O'Bannon, Houston, Tex.

Application September 8, 1953, Serial No. 378,900

5 Claims. (Cl. 73—17)

The present invention relates to apparatus for determining the dew point of a gas and more particularly to a method and apparatus for cooling a dew point tester.

It is desirable in many instances to know the temperature to which a gas, under-saturated with respect to water vapor, may be cooled before any water in such gas will begin to condense. This temperature is commonly referred to as the dew point temperature, and reasons for the desirability of knowing this temperature are well known to those skilled in the art. For example, in high pressure gas transmission lines, it is desirable to know the dew point of the gas so as to prevent interference with the flow of gas in the line by condensate.

Numerous devices have been proposed for measuring the dew point temperature of gas and generally such mechanisms include a device wherein the temperature at which condensate forms in the gas is noted on any suitable type indicating means such as a thermometer or other suitable type indicating mechanism such as an electric eye or the like. It is necessary in such mechanisms to gradually cool a surface therein whereby condensate from the gas being tested is formed thereon.

Heretofore, dewpoint testers have been cooled by providing refrigerants such as propane, liquid carbon dioxide, or liquid air. It is extremely disadvantageous to provide a refrigerant for the dew point tester from an outside source, such as containers of refrigerants above mentioned, because such refrigerant containers must be connected and disconnected each time they are used.

Also, it is difficult to accurately control the gradual cooling of dew point testers which may cause an error in the dew point temperature reading.

Other disadvantages of cooling the dew point tester by an outside source, such as a container attached thereto are believed to be obvious, and the present invention is directed to a novel arrangement and construction wherein a coolant or refrigerant medium is supplied to cool the dew point tester without the aid of an outside source as above discussed.

Still another object of the invention is to provide an apparatus for cooling a dew point tester which includes means for conducting a portion of the gas being treated to a separator wherein such portion is separated into hot and cool parts and conveying the cool part of such gas portion to the dew point tester to serve as a coolant medium.

Another object is to provide a means of cooling a dew point tester wherein the cooling rate of such tester may be controlled so as to obtain an accurate dew point temperature measurement.

Still another object of the invention is to provide apparatus for cooling a dew point tester which includes a means for conducting a portion of the gas being treated to a separator wherein such portion is separated into hot and cool parts and conveying the cool part of such gas portion to the dew point tester to serve as a coolant medium and thereafter conveying the cool part of the gas from the tester to a heat exchanger mounted adjacent the first mentioned conveying means, whereby the incoming temperature of the gas portion to the separator is reduced.

A further object of the invention is to provide means for receiving a gas whose dew point temperature is to be measured, additional means for conveying another portion of the same gas to a separator wherein such portion is divided into hot and cool parts, and thereafter conveying the cool part to the tester to serve as a coolant medium for reducing the temperature of the tester whereby condensate forms in the gas in the tester.

A still further object of the invention is to provide means for receiving a gas whose dew point temperature is to be measured, additional means for conveying another portion of the same gas to a separator wherein such portion is divided into hot and cool parts, and thereafter conveying the cool part to the tester to serve as a coolant medium for reducing the temperature of the tester whereby condensate forms in the gas in the tester, and additional means associated with the tester for indicating the temperature at which the condensate forms in the gas.

A still further object of the invention is to provide a gas tester wherein a surface is provided upon which condensate from the gas may form, means for conveying a portion of the gas over such surface, means for cooling the surface in the tester, means for conveying another portion of the same gas to a separator in which such portion is divided into hot and cool parts, and means for conveying the cool part of such portion to the cooling means whereby the surface in the tester may be cooled thereby.

A still further object of the invention is to provide a gas tester wherein a surface is provided upon which gas condensate may form, means for conveying a portion of the gas over such surface, means for conveying another portion of the same gas to a separator in which such portion is divided into hot and cool parts, and means for conveying the cool part of such portion to cool the surface in the chiller whereby condensate forms thereon, and indicating means for noting the temperature of the surface at which the condensate is formed thereon.

Yet a further object of the invention is to provide in combination with a gas dew point tester in which the dew point temperature of the gas is to be determined, means for receiving a portion of the same gas to be tested and for separating such portion into a hot and cool part and thereafter conveying the cool part to the tester for use as a refrigerant or coolant medium for lowering the temperature of the operating mechanism of the tester.

Other objects and advantages of the invention will become more readily apparent from a consideration of the following description and drawings wherein:

Fig. 1 is a schematic diagram illustrating one form of the invention;

Fig. 2 is a schematic diagram illustrating another form of the invention;

Fig. 3 is a perspective view, partly in section, illustrating one form of the separator means for separating the gas into a hot and cold part;

Fig. 4 is a sectional view of the separator and illustrates the flow of the hot and cold parts of the gas from the separator; and Fig. 5 is a sectional view illustrating the construction of the separator.

In Fig. 1, a conventional dew point tester is illustrated generally by the numeral 2. This dew point tester may be of the type as illustrated in Patent 2,281,418, issued to W. M. Deaton et al., on April 28, 1942. Associated with the dew point tester is a chiller 3 and temperature indicating means such as a thermometer 4 and pressure gauge 5 for indicating the pressure of the gas being measured in the dew point tester. The chiller, or cooler 3, thermometer 4, and gauge 5, may be arranged as illustrated in said above mentioned Deaton patent.

Other forms of dew point testers, including coolers and indicating media, are shown and may be used in practicing the present invention, some of such constructions being as illustrated in the patent to A. B. Martin et al., No. 2,108,173, issued on February 15, 1938, or in the patent to J. J. Turin, No. 2,376,209, issued on May 15, 1945, or in the patent to F. W. Schmitz, No. 2,433,486, issued December 30, 1947.

It is, therefore, believed unnecessary, for the purposes of the present invention, to give a detailed description of the dew point tester, including the chiller chamber 3 and temperature indicating means 4, since any suitable construction may be used.

One of the primary disadvantages with dew point testers heretofore used is the arrangement of the means for supplying a coolant or refrigerant to the cooler 3. Heretofore, such refrigerants have been in the form of propane, liquid carbon dioxide or liquid air or other suitable mediums which are carried in a container and then secured to the cooler 3 at the time it is desired to cool such cooler and the reflective surface or indicative surface 6 which is arranged in the dew point tester 2 and which surface is thermally connected to cooler 3. The refrigerant is supplied to the cooler which in turn cools the surface 6. As gas flows through the dew point tester, and when the surface 6 has been cooled sufficiently, condensate from the gas being tested will form and may be detected or observed in any suitable manner on the surface 6. The thermometer 4 is associated with the surface 6 so that the temperature of the surface 6 at which condensate from the gas sample flowing through the tester forms thereon may be noted.

It is extremely disadvantageous to supply a refrigerant or coolant in accordance with present day practices. For example, it may be necessary to carry several containers with each container having a different refrigerant so as to be sure that the right kind of refrigerant is available for the test, in order that the cooler 3 and surface 6 may be cooled sufficiently so that condensate from the gas being tested will form thereon. Also, if one container of refrigerant becomes exhausted during a test, then a fresh container must be attached before the test can be continued.

In order to obtain a true and correct dew point reading the temperature of the surface, at the time of condensation thereon, must be correctly indicated by the indicating medium represented at 4. Therefore, if the tester is cooled too rapidly, a lag between the actual temperature of the surface 6 and the indicating medium will arise and therefore a false or incorrect dew point will be indicated.

The present invention provides apparatus whereby it is unnecessary to provide a refrigerant from an outside source such as a container of propane, liquid carbon dioxide or liquid air or the like, and which will give a more accurate means of establishing equilibrium in the apparatus to give a correct reading.

I have discovered that the gas being tested may be used as the refrigerant medium. The gas stream may be divided into two portions, one portion which may be passed through the tester in order that its dew point may be determined, and the other portion of the gas is then utilized as a coolant or refrigerant for cooling the chiller or cooler 3 and the surface 6 within the dew point tester.

The drawings illustrate several ways in which this may be accomplished. For example, in Fig. 1, the gas to be tested is withdrawn from a pipe line or conduit through a pipe 8. One portion of the gas is passed through the branch conduit 9 and to the dew point tester so that the dew point temperature of the gas may be determined. Suitable means in the form of a conductor 10 are provided whereby the other portion of the gas stream is directed to a separator 11 in which such other gas portion is divided into a cold part and a hot part. The cold part of the gas is then conducted by suitable means such as pipe 12 to the cooler 3 where it cools such cooler and the surface 6 which is thermally coupled with the cooler. The gas may then be discharged through the line 13 and the hot part of the gas stream may be conducted from the separator 11 by the pipe 14 and thence discharged.

As shown in Fig. 2, the pipe 13 leading from cooler 3 is connected into heat exchanger 15 which surrounds conduit means 10 on the intake side of the separator 11. Therefore, after the gas has served to cool the cooler 3, it may be passed to the heat exchanger so as to initially cool, or lower the incoming temperature of the gas to the separator 11. Such gas may then be discharged from the heat exchanger at 16 as shown in Fig. 2. Since the initial temperature of the gas to the separator 11 is thus lowered, the temperature of the cool part of the gas leaving pipe 12 can be lowered whereby a refrigerant is provided which is cool enough to chill the surface 6 in the dew point tester to a low enough temperature whereby the dew point of the gas may be noted. The hot part of the gas stream is discharged through pipe 14 as is the case with the invention discussed in accordance with Fig. 1.

The construction of the separator may be of any suitable form, such as that shown in the patent to G. J. Ranque, No. 1,952,281, issued on March 27, 1934. Reference is also made to Figs. 3, 4, and 5 of the drawings, wherein one form of a Hilsch vortex tube type separator is illustrated. The separator is shown as having an intake 17 connected to laterally extending body portion 18, such intake having its opening 19 arranged on a tangent within the body as illustrated in Figs. 3 and 5. Thus, when the gas is discharged into the body it is guided around the surface 20 and a circular motion imparted thereto whereby the gas separates into a cold part as illustrated at 21 and a hot part 22 in Fig. 4 of the drawings.

No one exactly understands why the gas separates into a hot part and a cold part when it is injected into a separator as shown, for example, in Figs. 3 and 5. However, the gas will separate into the cold part 21 and hot part 22 with the cold part being in the center and the hot part surrounding such cold part as shown in Fig. 4. The end of pipe 12 fitting in housing 18 may be provided with a small opening 23 whereby only the cooler part of the gas is conducted into pipe 12. The end of pipe 14 is provided with a wide opening 24 so that the hot part of the gas surrounding the cold part may flow thereinto. The pipe 14 is provided with a valve 25 and in order to obtain cool air out line 12, this valve is closed when flow through the separator 11 from the pipe 10 is first started.

The valve 25 also serves to control the temperature of the cool portion of the gas and by opening or closing this valve the temperature of the cool portion of the gas may be increased or decreased. After cool gas starts flowing through line 12, the valve 25 may be regulated so as to gradually and stepwise lower the temperature of the cool portion of the gas. Thus, it will be easier to maintain equilibrium conditions in the tester during the cooling thereof whereby a more accurate reading may be obtained. By gradually cooling the tester, the true temperature of surface 6 will be correctly reflected by the indicating means represented by the thermometer 4. This will prevent a temperature lag between the two so that a correct dew point temperature will be obtained.

By way of further illustration and example, I have constructed a separator having the following dimensions:

Inlet nozzle 19, .052 inch diameter; major radius in body 18 adjacent nozzle 19, .1474 inch; minor radius in body 18 at 27, .1063 inch; width of surface 20, .063 inch; diameter of opening 23, .098 inch; width of opening 24, .218 inch; length of conduit 12, from edge of opening 23 adjacent surface 20 to end of conduit, 4⅜ inches; length of conduit 14, from edge of opening 24 adjacent surface 20 to end of conduit, 13⅞ inches; conduits 12 and 14 may be formed of ⅛ inch extra strong pipe having .405 inch O. D. and .215 I. D.

The above dimensions are given only for the purposes of illustration and not by way of limitation as being the only dimensions useable in construction separator 11.

By utilizing a construction as above described on gas with an initial pressure of 820 pounds per square inch, and allowing such gas to fall off in pressure to atmospheric pressure and conducting it through a separator having the above dimensions, the temperature in the chiller 3, to which such device was connected, and the temperature of surface 6 was lowered to −35 degrees F. The initial temperature of the gas had been 59 degrees F.

When flow is initially started through separator 11, it is necessary to close valve 25 in line 14 to induce a cold flow from pipe 12 and into cooler 3. The temperature of the cold part of the gas in line 12 may be regulated by adjusting valve 25 as previously discussed. Therefore, it is possible to gradually or stepwise cool the chiller 3 and surface 6 in dew point tester 2 so that the temperature at which condensate forms on such surface may be noted by means of the thermometer 4 or other suitable indicating media. Suitable means may be provided for indicating when condensate forms on the surface 6 so that the temperature at such occurrence may be determined or indicated.

With the heat exchanger arranged on pipe 10 as illustrated in Fig. 2, the device will provide sufficient lower temperatures in the cold part of the gas going out pipe 12 so that the chiller, and surface 6 thermally connected therewith, can be lowered to any temperature ordinarily encountered in present day dew point measurements.

From the foregoing it is seen that I have provided a method and apparatus for measuring the dew point of a gas, in which a portion of the gas being measured is used as the coolant or refrigerant for the dew point tester. This obviates the necessity of providing a refrigerant in a separate container and eliminates the provision of extra containers in case one container is emptied during the test, or additional containers for different refrigerants, in case the dew point temperature of the gas being tested is lower than the temperature of the refrigerant being used. Simply by adjusting valve 25, I am able to gradually cool the dew point tester to a sufficiently low temperature whereby its dew point may be indicated by the means illustrated at 4.

If desired, other sources of gas, other than that going to the tester may be supplied to line 10 and separator 11 whereby the cool part of such gas may serve as the coolant.

Broadly, the invention relates to an apparatus for determining the dew point of a gas and more particularly to a method and apparatus for cooling a dew point tester, in which a portion of the gas being tested is used as the refrigerant or coolant for the dew point tester.

What is claimed is:

1. In an apparatus for cooling a gas dew point tester wherein a gas is passed through the tester for determination of its dew point the combination comprising, conductor means for receiving a portion of the gas being tested, a Hilsch vortex tube associated with said conductor means for dividing such gas portion into a hot and cool part, means for conducting the cool part of such gas to the tester for cooling a surface in the tester whereby the gas flowing therethrough may form a condensate thereon, means for conducting the hot gas portion from said tube, and responsive means associated with the surface in the tester for instrumentally determining the temperature at which condensate forms in the gas being tested.

2. Apparatus for determining the dew point of a gas comprising a conduit for conducting the gas to be tested, a branch conduit communicating therewith, a dew point tester connected to said branch line in which the dew point of the gas may be instrumentally determined, a conductor communicating with said conduit for conducting a portion of the test gas therefrom, a Hilsch vortex tube type separator connected to said conductor for separating that portion of the gas flowing therethrough into hot and cold portions, a chiller connected for receiving the cold gas portion of said separator, means in said tester thermally coupled with said chiller whereby the temperature of said means may be reduced so that the gas flowing through said tester will form a condensate on said means, and means for instrumentally determining the temperature at which condensate forms as an indication of the dew point of the gas flowing through said tester.

3. Apparatus for determining the dew point of a gas comprising, a conduit for conducting the gas to be tested, a branch conduit communicating therewith, a dew point tester connected for communication with said branch line, a conductor communicating with said conduit for conducting a portion of the test gas from said conduit, a Hilsch vortex tube type separator connected for communication with said conductor for separating that portion of the test gas flowing therethrough into hot and cold portions, a chiller connected for receiving the cold gas portion, pipe means for discharging the hot gas portion from said separator, valve means in said pipe for regulating the temperature of said cold gas portion whereby it may be gradually reduced in temperature to stepwise cool said chiller, means in said tester thermally coupled with said chiller whereby the temperature of said means may be gradually cooled so that the test gas flowing therethrough from said branch line may contact said cooled means and form a condensate therein, and means for instrumentally determining the temperature at which condensate forms as an indication of the dew point of the gas flowing through said tester.

4. Apparatus for determining the dew point of a gas comprising, a conduit for conducting the gas to be tested, a branch conduit communicating therewith, a dew point tester connected for communication with said branch line, a conductor communicating with said conduit for conducting a portion of the test gas from said conduit, a Hilsch vortex tube type separator connected for communication with said conductor for separating that portion of the test gas flowing therethrough into hot and cold portions, a chiller connected for receiving the cold gas portion, pipe means for discharging the hot gas portion from said separator, valve means in said pipe for regulating the temperature of said cold gas portion whereby it may be gradually reduced in temperature to stepwise cool said chiller, indicative surface means in said tester thermally coupled with said chiller whereby the temperature of said means may be gradually cooled so that the test gas flowing therethrough from said branch line may contact said cooled means and form a condensate thereon, and thermometer means associated with said indicative surface means for determining the temperature at which condensate forms as an indication of the dew point of the gas flowing through said tester.

5. Apparatus for determining the dew point of a gas comprising a conduit for conducting the gas to be tested, a branch conduit communicating therewith, a dew point tester connected to said branch line in which the dew point of the gas may be instrumentally determined, a conductor communicating with said conduit for conducting a portion of the test gas therefrom, a Hilsch vortex tube type separator connected to said conductor for separating that portion of the gas flowing therethrough into hot and cold portions, a chiller connected for receiving the cold gas portion of said separator, reflective surface means in said tester thermally coupled with said chiller whereby the temperature of said means may be reduced so that the gas flowing through said tester will form a condensate on said means, and thermometer means associated with said reflective surface means for determining the temperature at which condensate forms as an indication of the dew point of the gas flowing through said tester.

References Cited in the file of this patent

UNITED STATES PATENTS

| | | |
|---|---|---|
| 1,952,281 | Ranque | Mar. 27, 1934 |
| 2,281,418 | Deaton et al. | Apr. 28, 1942 |
| 2,566,307 | Boyle | Sept. 4, 1951 |
| 2,581,168 | Bramley | Jan. 1, 1952 |

OTHER REFERENCES

"Low Temp. Research," Ind. Eng. Chem., Dec. 1946, pages 5, 8, 10, 12 and 14.

Journal of the ASRE, "An Analysis of the Hilsch Vortex Tube," Feb. 1950, pages 163 to 171.

Journal of the ASRE, "Ranques Tube," May 1950, pages 473 to 479.